(12) United States Patent
Yabuguchi et al.

(10) Patent No.: US 8,446,115 B2
(45) Date of Patent: May 21, 2013

(54) MOTOR DRIVE DEVICE

(75) Inventors: Michisada Yabuguchi, Kasugai (JP);
Takenobu Nakamura, Kani (JP);
Shinichi Kuratani, Kasugai (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 243 days.

(21) Appl. No.: 13/082,856

(22) Filed: Apr. 8, 2011

(65) Prior Publication Data

US 2011/0248656 A1 Oct. 13, 2011

(30) Foreign Application Priority Data

Apr. 8, 2010 (JP) ................................. 2010-089538

(51) Int. Cl.
*H02P 21/00* (2006.01)

(52) U.S. Cl.
USPC ................. 318/400.02; 318/400.15; 318/721; 318/432

(58) Field of Classification Search
USPC .................. 318/400.02, 400.15, 400.22, 721, 318/722, 437, 432
See application file for complete search history.

(56) References Cited

U.S. PATENT DOCUMENTS

| 5,903,129 | A * | 5/1999 | Okuno et al. ................. 318/721 |
| 7,141,948 | B2 * | 11/2006 | Kifuku et al. ................. 318/432 |
| 7,548,038 | B2 * | 6/2009 | Atarashi et al. ............... 318/494 |
| 7,694,777 | B2 * | 4/2010 | Yamashita et al. ............ 180/443 |
| 7,859,206 | B2 * | 12/2010 | Suzuki ..................... 318/400.02 |
| 7,872,435 | B2 * | 1/2011 | Imai et al. ..................... 318/599 |
| 2008/0035411 | A1 | 2/2008 | Yamashita et al. |
| 2008/0211446 | A1 | 9/2008 | Kobayashi |
| 2009/0021194 | A1 | 1/2009 | Tonami et al. |

FOREIGN PATENT DOCUMENTS

| EP | 1460758 A2 | 9/2004 |
| EP | 2012425 A1 | 1/2009 |
| JP | 2006288076 A | 10/2006 |
| WO | 03/041260 A1 | 5/2003 |
| WO | 2005081397 A1 | 9/2005 |

OTHER PUBLICATIONS

Extended European Search Report for European Application No. 11 161 640.5 Dated Jul. 15, 2011 (6 pages).

* cited by examiner

*Primary Examiner* — Walter Benson
*Assistant Examiner* — Thai Dinh
(74) *Attorney, Agent, or Firm* — Osha Liang LLP

(57) ABSTRACT

A motor drive device has a drive circuit for driving a motor, and a control section for controlling the drive circuit. The control section has a current command value calculating portion for calculating a current command value, a rotation calculating portion for calculating a rotation angle and an angular speed of the motor, a current command value correcting portion for correcting the current command value based on the rotation angle, a voltage command value calculating portion for calculating a voltage command value based on the current command value, a voltage command value correcting portion for correcting the voltage command value based on the current command value and the rotation angle and the angular speed, and a drive signal generating portion for generating a drive signal based on the voltage command value.

6 Claims, 10 Drawing Sheets

MOTOR DRIVE DEVICE

BACKGROUND OF THE INVENTION

1. Technical Field

The present invention relates to a motor drive device including a drive circuit for driving a motor, and a control section for controlling the drive circuit.

2. Related Art

A motor drive device 500 including an inverter 510 for driving a motor 550, and a control section 520 for controlling the inverter 510, as shown in FIG. 14, is conventionally known. This motor 550 is, for example, a three-phase brushless motor.

The inverter 510 generates a drive current of three phases based on a PWM signal inputted from the control section 520. The inverter 510 drives the motor 550 by outputting the drive current of three phases to the motor 550.

The control section 520 includes a current command value calculating portion 521, a rotation calculating portion 522, a current actual measurement value calculating portion 523, a voltage command value calculating portion 524, and a drive signal generating portion 525.

A current command value Iref is inputted to the current command value calculating portion 521, so that the current command value calculating portion 521 calculates a d-axis current command value Ir_d and a q-axis current command value Ir_q based on the current command value Iref. The current command value calculating portion 521 then outputs the d-axis current command value Ir_d and the q-axis current command value Ir_q to the voltage command value calculating portion 524.

The rotation calculating portion 522 calculates a rotation angle θ of the motor 550 based on a detection signal of a resolver 551 for detecting a rotation angle of the motor 550. The rotation calculating portion 522 outputs the rotation angle θ to the current actual measurement value calculating portion 523 and the drive signal generating portion 525.

The current actual measurement value calculating portion 523 calculates current actual measurement values Iu, Iv, Iw of each phase flowing to the motor 550 based on the detection result of the current detection portion 511. The current actual measurement value calculating portion 523 converts the current actual measurement values Iu, Iv, Iw to d-axis current actual measurement value If_d and q-axis current actual measurement value If_q using the rotation angle θ of the motor 550 calculated by the rotation calculating portion 522. Thereafter, the current actual measurement value calculating portion 523 outputs the d-axis current actual measurement value If_d and the q-axis current actual measurement value If_q to the voltage command value calculating portion 524.

The voltage command value calculating portion 524 calculates a d-axis voltage command value V_d based on the d-axis current command value Ir_d inputted from the current command value calculating portion 521 and the d-axis current actual measurement value If_d inputted from the current actual measurement value calculating portion 523, and also calculates a q-axis voltage command value V_q based on the q-axis current command value Ir_q inputted from the current command value calculating portion 521 and the q-axis current actual measurement value If_q inputted from the current actual measurement value calculating portion 523. The voltage command value calculating portion 524 then outputs the d-axis voltage command value V_d and the q-axis voltage command value V_q to the drive signal generating portion 525.

The drive signal generating portion 525 converts the d-axis voltage command value V_d and the q-axis voltage command value V_q inputted from the voltage command value calculating portion 524 to application voltage values Vu, Vv, Vw of three phases using the rotation angle θ of the motor 550 calculated by the rotation calculating portion 522. The drive signal generating portion 525 then generates a PWM signal (PWMu, PWMv, PWMw) for driving the inverter 510 based on the application voltage values Vu, Vv, Vw of three phases.

When such a conventional motor drive device 500 drives the motor 550, the inductive voltage of the motor 550 is desirably a sinusoidal wave. However, the inductive voltage of the motor 550 has a drawback in that torque ripple and abnormal sound occur since a harmonic wave is superimposed on the fundamental wave.

In the prior art, a motor drive device including a current command value correcting portion for suppressing the occurrence of torque ripple and abnormal sound has been proposed (see e.g., Japanese International Patent Publication WO 2005/081397 and Japanese Unexamined Patent Publication No. 2006-288076).

Japanese International Patent Publication WO 2005/081397 discloses a motor drive device including a current command value correcting portion that receives a q-axis current command value from a current command value calculating portion and receives a rotation angle of the motor from a rotating calculating portion. Such current command value correcting portion adds a correction value corresponding to the rotation angle of the motor to the q-axis current command value and outputs the q-axis current command value added with the correction value to the voltage command value calculating portion.

Japanese Unexamined Patent Publication No. 2006-288076 discloses a motor drive device including a current command value correcting portion that receives a d-axis current command value and a q-axis current command value from a current command value calculating portion, and receives a rotation angle of the motor from a rotation calculating portion. Such current command value correcting portion corrects the d-axis current command value and the q-axis current command value based on the rotation angle of the motor and a parameter of the motor. The current command value correcting portion outputs the corrected d-axis current command value and the q-axis current command value to a voltage command value calculating portion.

SUMMARY

However, in the conventional motor drive device disclosed in Japanese International Patent Publication WO 2005/081397 and Japanese Unexamined Patent Publication No. 2006-288076, the occurrence of torque ripple and abnormal noise may not be sufficiently suppressed due to delay in feedback from the rotation calculating portion and the current actual measurement value calculating portion, and delay in calculation of each portion such as the current command value correcting portion if the rotation of the motor is high speed.

One or more embodiments of the present invention provides a motor drive device capable of sufficiently suppressing the occurrence of torque ripple and abnormal noise at the time of motor drive. One or more embodiments of the present invention provides a motor drive device capable of sufficiently suppressing the occurrence of torque ripple and abnormal noise even if the motor rotates at high speed.

In accordance with one aspect of the present invention, a motor drive device includes a drive circuit for driving a motor;

and a control section for controlling the drive circuit. The control section includes a current command value calculating portion for calculating a current command value, a rotation calculating portion for calculating a rotation angle and an angular speed of the motor, a current command value correcting portion for correcting the current command value calculated by the current command value calculating portion based on the rotation angle calculated by the rotation calculating portion, a voltage command value calculating portion for calculating a voltage command value based on the current command value corrected by the current command value correcting portion, a voltage command value correcting portion for correcting the voltage command value calculated by the voltage command value calculating portion based on the current command value calculated by the current command value calculating portion and the rotation angle and the angular speed calculated by the rotation calculating portion, and a drive signal generating portion for generating a drive signal based on the voltage command value corrected by the voltage command value correcting portion.

According to such a configuration, the delay in feedback and the delay in calculation of each portion such as the current command value correcting portion can be compensated by the voltage command value correcting portion even when the motor rotates at high speed, and thus the occurrence of torque ripple and abnormal noise can be sufficiently suppressed by the current command value correcting portion.

In the motor drive device, the current command value calculating portion may calculate a d-axis current command value and a q-axis current command value; and the voltage command value correcting portion may correct the voltage command value calculated by the voltage command value calculating portion based on the d-axis current command value and the q-axis current command value calculated by the current command value calculating portion, and the rotation angle and the angular speed calculated by the rotation calculating portion.

In such as case, a current detection portion for detecting the current supplied from the drive circuit to the motor is further arranged, wherein the control section further includes a current actual measurement value calculating portion for calculating a d-axis current actual measurement value and a q-axis current actual measurement value based on the detection result of the current detection portion and the rotation angle calculated by the rotation calculating portion; the current command value correcting portion corrects the d-axis current command value and the q-axis current command value calculated by the current command value calculating portion based on the rotation angle calculated by the rotation calculating portion; and the voltage command value calculating portion calculates a d-axis voltage command value based on the d-axis current command value corrected by the current command value correcting portion and the d-axis current actual measurement value, and calculates a q-axis voltage command value based on the q-axis current command value corrected by the current command value correcting portion and the q-axis current actual measurement value.

In the motor drive device in which the voltage command value calculating portion calculates the d-axis voltage command value and the q-axis voltage command value, the voltage command value correcting portion includes a correction value calculating portion for calculating a d-axis correction value and a q-axis voltage correction value based on the d-axis current command value and the q-axis current command value calculated by the current command value calculating portion, and the rotation angle and the angular speed calculated by the rotation calculating portion, a first adder for adding the d-axis voltage correction value calculated by the correction value calculating portion to the d-axis voltage command value calculated by the voltage command value calculating portion, and a second adder for adding the q-axis voltage correction value calculated by the correction value calculating portion to the q-axis voltage command value calculated by the voltage command value calculating portion; and the drive signal generating portion generates the drive signal based on the d-axis voltage command value, to which the d-axis voltage correction value is added by the first adder, the q-axis voltage command value, to which the q-axis voltage correction value is added by the second adder, and the rotation angle calculated by the rotation calculating portion.

In the motor drive device in which the voltage command value correcting portion includes the correction value calculating portion, the correction value calculating portion of the voltage command value correcting portion includes a first calculating portion for calculating a d-axis correction value and a q-axis correction value of a resistance component of the motor based on the d-axis current command value and the q-axis current command value calculated by the current command value calculating portion, and the rotation angle calculated by the rotation calculating portion, a second calculating portion for calculating a d-axis correction value and a q-axis correction value of an inductance component of the motor based on the d-axis current command value and the q-axis current command value calculated by the current command value calculating portion, and the rotation angle and the angular speed calculated by the rotation calculating portion, and a third calculating portion for calculating a d-axis correction value and a q-axis correction value of an inductive voltage component of the motor based on the rotation angle and the angular speed calculated by the rotation calculating portion.

In the motor drive device in which the correction value calculating portion includes the first calculating portion, the second calculating portion, and the third calculating portion, the correction value calculating portion of the voltage command value correcting portion further includes a third adder for adding the d-axis correction value calculated by the first calculating portion, the d-axis correction value calculated by the second calculating portion, and the d-axis correction value calculated by the third calculating portion to calculate the d-axis voltage correction value, and a fourth adder for adding the q-axis correction value calculated by the first calculating portion, the q-axis correction value calculated by the second calculating portion, and the q-axis correction value calculated by the third calculating portion to calculate the q-axis voltage correction value.

According to one or more embodiments of the present invention, a motor drive device capable of sufficiently suppressing the occurrence of torque ripple and abnormal noise at the time of motor drive can be provided. In particular, a motor drive device capable of sufficiently suppressing the occurrence of torque ripple and abnormal noise even if the motor rotates at high speed can be provided.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, a configuration of a motor drive device 100 according to one embodiment of the present invention will be described with reference to FIG. 1

Figure 1:
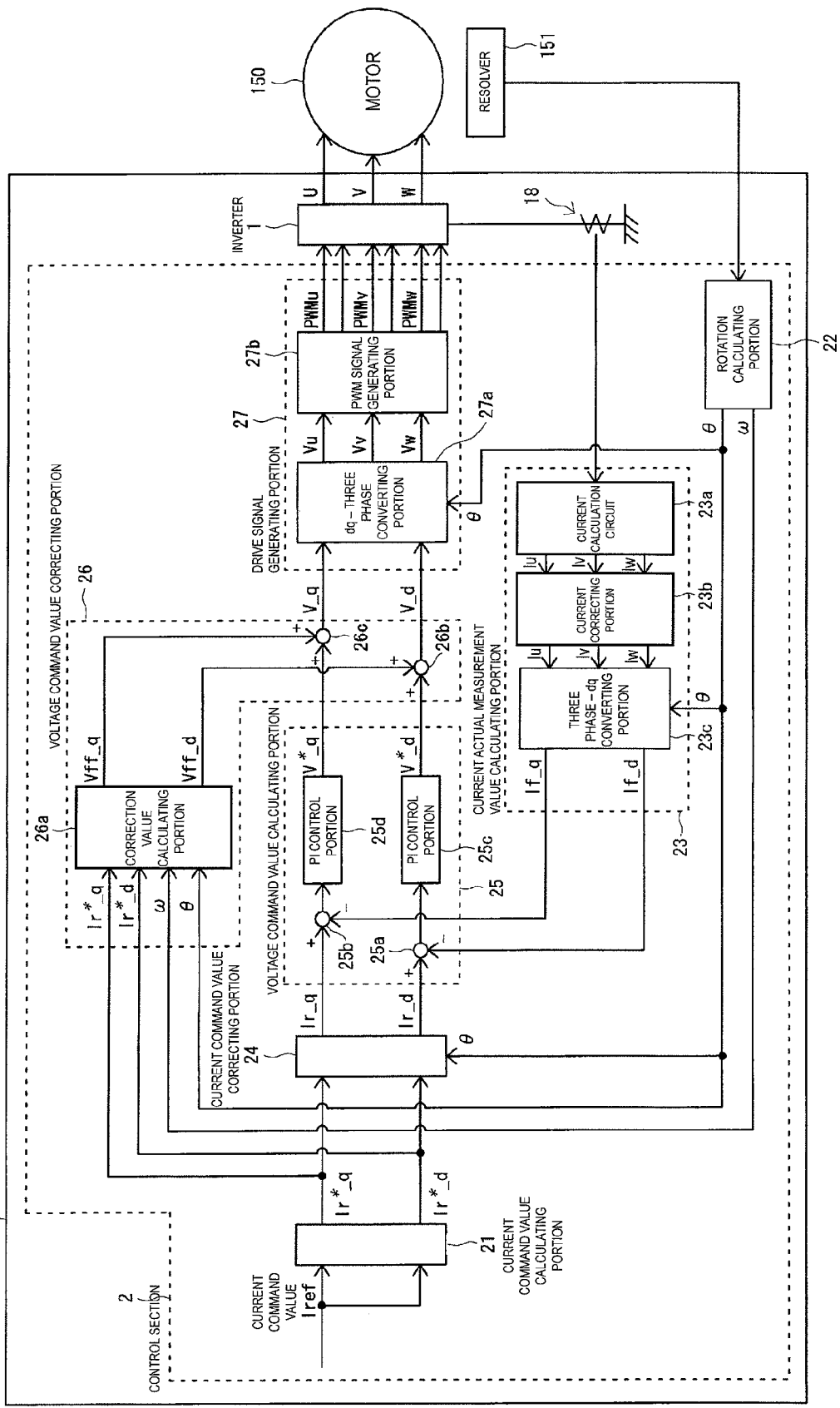
FIG. 1 is a block diagram showing a configuration of a motor drive device according to one embodiment of the present invention.

As shown in FIG. 1, the motor drive device 100 according to one or more embodiments of the present invention includes an inverter 1 for driving a motor 150, and a control section 2 for controlling the inverter 1. The motor 150 is a three phase brushless motor used in an electric power steering device of a vehicle, or the like. The inverter 1 serves as a "drive circuit" according to one or more embodiments of the present invention.

Figure 2:
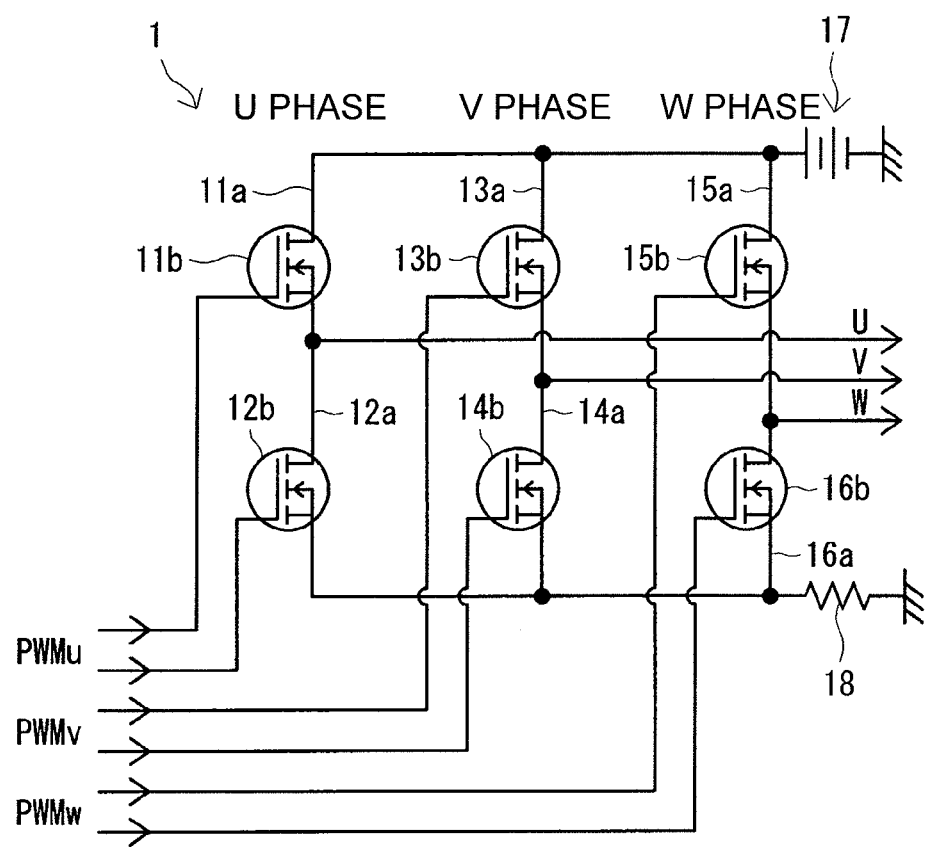
FIG. 2 is a circuit diagram showing an inverter of the motor drive device of FIG. 1.

As shown in FIG. 2, the inverter 1 is configured by a three phase bridge in which three sets of a pair of upper and lower arms are arranged in correspondence with a U phase, a V phase, and a W phase. An upper arm 11a of the U phase includes a switching element 11b, and a lower arm 12a of the U phase includes a switching element 12b. An upper arm 13a of the V phase includes a switching element 13b, and a lower arm 14a of the V phase includes a switching element 14b. An upper arm 15a of the W phase includes a switching element 15b, and a lower arm 16a of the W phase includes a switching element 16b.

A power supply 17 for supplying current to the motor 150 is connected to the upper arms 11a, 13a, and 15a, and a resistor 18 for detecting current flowing to the motor 150 is connected to the lower arms 12a, 14a, and 16a. The resistor 18 serves as a "current detection portion" according to one or more embodiments of the present invention. The switching elements 11b to 16b are FET (Field Effect Transistor) or the like, and have ON/OF state that is controlled based on a PWM signal (PWMu, PWMv, PWMw) inputted from the control section 2.

The inverter 1 generates a drive current of three phases based on the PWM signal inputted from the controller 2. The inverter 1 drives the motor 150 by outputting the drive current of three phases to the motor 150.

The control section 2 is configured by a CPU, a ROM, a RAM, and the like. As shown in FIG. 1, the control section 2 includes a current command value calculating portion 21, a rotation calculating portion 22, a current actual measurement value calculating portion 23, a current command value correcting portion 24, a voltage command value calculating portion 25, a voltage command value correcting portion 26, and a drive signal generating portion 27.

The current command value calculating portion 21 receives a current command value Iref, and the current command value calculating portion 21 calculates a d-axis current command value Ir*_d and a q-axis current command value Ir_q based on the current command value Iref. The current command value calculating portion 21 outputs the d-axis current command value Ir*_d and the q-axis current command value Ir_q to the current command value correcting portion 24 and the voltage command value correcting portion 26.

The rotation calculating portion 22 calculates a rotation angle $\theta$ and an angular speed $\omega$ of the motor 150 based on a detection signal of a resolver 151 for detecting the rotation angle of the motor 150. The rotation calculating portion 22 outputs the rotation angle $\theta$ to the current actual measurement value calculating portion 23, the current command value correcting portion 24, the voltage command value correcting portion 26, and the drive signal generating portion 27, and outputs the angular speed $\omega$ to the voltage command value correcting portion 26. The angular speed $\omega$ is calculated based on the amount of change per unit time of the rotation angle $\theta$.

The current actual measurement value calculating portion 23 includes a current calculation circuit 23a, current correcting portion 23b, and a three phase—dq converting portion 23c.

The current calculation circuit 23a calculates the current actual measurement value Iu, Iv, Iw of each phase flowing to the motor 150 based on the voltage generated at both ends of the resistor 18. A relationship of the following equation (1) is met among the current actual measurement values Iu, Iv, Iw of each phase.

$$Iu+Iv+Iw=0 \qquad (1)$$

Therefore, in practice, the current actual measurement values of two phases out of the three phases are calculated, and the current actual measurement value of the remaining one phase is calculated from such a current actual measurement values. For instance, if the current actual measurement value Iu of the U phase and the current actual measurement value Iw of the W phase are calculated, the current actual measurement value Iv of the V phase can be obtained from the following equation (2).

$$Iv=-(Iu+Iw) \qquad (2)$$

The current correcting portion 23b performs a predetermined correction process on the current actual measurement values Iu, Iv, Iw calculated by the current calculation circuit 23a. The three phase—dq converting portion 23c converts the current actual measurement values Iu, Iv, Iw corrected by the current correcting portion 23b to a d-axis current actual measurement value If_d and a q-axis current actual measurement value If_q using the rotation angle $\theta$ of the motor 150 calculated by the rotation calculating portion 22. The three phase—dq converting portion 23c outputs the d-axis current actual measurement value If_d and the q-axis current actual measurement value If_q to the voltage command value calculating portion 25. The three phase—dq conversion is carried out according to the following equation (3).

[Equation 1]

$$\begin{pmatrix} \text{If\_d} \\ \text{If\_q} \end{pmatrix} = \sqrt{\frac{2}{3}} \begin{pmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{pmatrix} \begin{pmatrix} Iu \\ Iv \\ Iw \end{pmatrix} \quad (3)$$

The current command value correcting portion 24 corrects the d-axis current command value Ir*_d and the q-axis current command value Ir*_q inputted from the current command value calculating portion 21 based on the rotation angle θ inputted from the rotation calculating portion 22. The current command value correcting portion 24 outputs the corrected d-axis current command value Ir_d and the q-axis current command value Ir_q to the voltage command value calculating portion 25.

The current command value correcting portion 24 is provided to correct the sixth-order torque ripple that occurs from the fifth-order harmonics and the seventh-order harmonics of the inductive voltage of the motor 150. The current command value correcting portion 24 calculates the d-axis current command value Ir_d according to the following equation (4), and calculates the q-axis current command value Ir_q according to the following equation (5). In the following equations (4) to (9), Gt5 is a correction coefficient of the torque ripple caused by the fifth-order harmonics and Gt7 is a correction coefficient of the torque ripple caused by the seventh-order harmonics. Furthermore, Gt5 and Gt7 are constants determined according to the specification of the motor 150, and the like.

[Equation 2]

$$\text{Ir\_d} = \text{Ir}^*\_\text{d} + Gt5 \cdot \{\text{Ir}^*\_\text{q} \cdot \sin(6\theta) + \text{Ir}^*\_\text{d} \cdot \cos(6\theta)\} + \quad (4)$$
$$Gt7 \cdot \{\text{Ir}^*\_\text{q} \cdot \sin(6\theta) + \text{Ir}^*\_\text{d} \cdot \cos(6\theta)\}$$

$$\text{Ir\_q} = \text{Ir}^*\_\text{q} + Gt5 \cdot \{\text{Ir}^*\_\text{q} \cdot \cos(6\theta) + \text{Ir}^*\_\text{d} \cdot \sin(6\theta)\} - \quad (5)$$
$$Gt7 \cdot \{\text{Ir}^*\_\text{q} \cdot \cos(6\theta) - \text{Ir}^*\_\text{d} \cdot \sin(6\theta)\}$$

The voltage command value calculating portion 25 includes subtractors 25a and 25b, and PI (Proportional Integral) control portions 25c and 25d.

The subtractor 25a receives the d-axis current command value Ir_d from the current command value correcting portion 24, and also receives the d-axis current actual measurement value If_d from the current actual measurement value calculating portion 23. The subtractor 25a calculates the deviation between the d-axis current command value ir_d and the d-axis current actual measurement value If_d, and outputs the calculated deviation to the PI control portion 25c.

The subtractor 25b receives the q-axis current command value Ir_q from the current command value correcting portion 24, and also receives the q-axis current actual measurement value If_q from the current actual measurement value calculating portion 23. The subtractor 25b calculates the deviation between the q-axis current command value Ir_q and the q-axis current actual measurement value If_q, and outputs the calculated deviation to the PI control portion 25d.

The PI control portion 25c calculates a d-axis voltage command value V*_d corresponding to the deviation inputted from the subtractor 25a, and outputs the d-axis voltage command value V*_d to the voltage command value correcting portion 26.

The PI control portion 25d calculates a q-axis voltage command value V*_q corresponding to the deviation inputted from the subtractor 25b, and outputs the q-axis voltage command value V*_q to the voltage command value correcting portion 26.

The voltage command value correcting portion 26 corrects the d-axis voltage command value V*_d and the q-axis voltage command value V*_q inputted from the voltage command value calculating portion 25 based on the d-axis current command value Ir*_d and the q-axis current command value Ir*_q inputted from the current command value calculating portion 21, and the rotation angle θ and the angular speed w inputted from the rotation calculating portion 22. The voltage command value correcting portion 26 outputs the corrected d-axis voltage command value V_d and the q-axis voltage command value V_q to the drive signal generating portion 27.

The voltage command value correcting portion 26 is arranged to perform a feed forward control to cancel out the torque ripple that occurs from the harmonic component of the inductive voltage of the motor 150. The voltage command value correcting portion 26 cancels out the torque ripple at the time of high speed rotation of the motor 150, in particular, to enhance the responsiveness at the time of high speed rotation of the motor 150. The voltage command value correcting portion 26 includes a correction value calculating portion 26a, and adders 26b and 26c. The adders 26b and 26c respectively serves as a "first adder" and a "second adder" according to one or more embodiments of the present invention.

The correction value calculating portion 26a calculates a d-axis voltage correction value Vff_d and a q-axis voltage correction value Vff_q based on the d-axis current command value Ir*_d and the q-axis current command value Ir*_q inputted from the current command value calculating portion 21, and the rotation angle θ and the angular speed w inputted from the rotation calculating portion 22. The correction value calculating portion 26a outputs the d-axis voltage correction value Vff_d to the adder 26b, and the q-axis voltage correction value Vff_q to the adder 26c.

Figure 3:
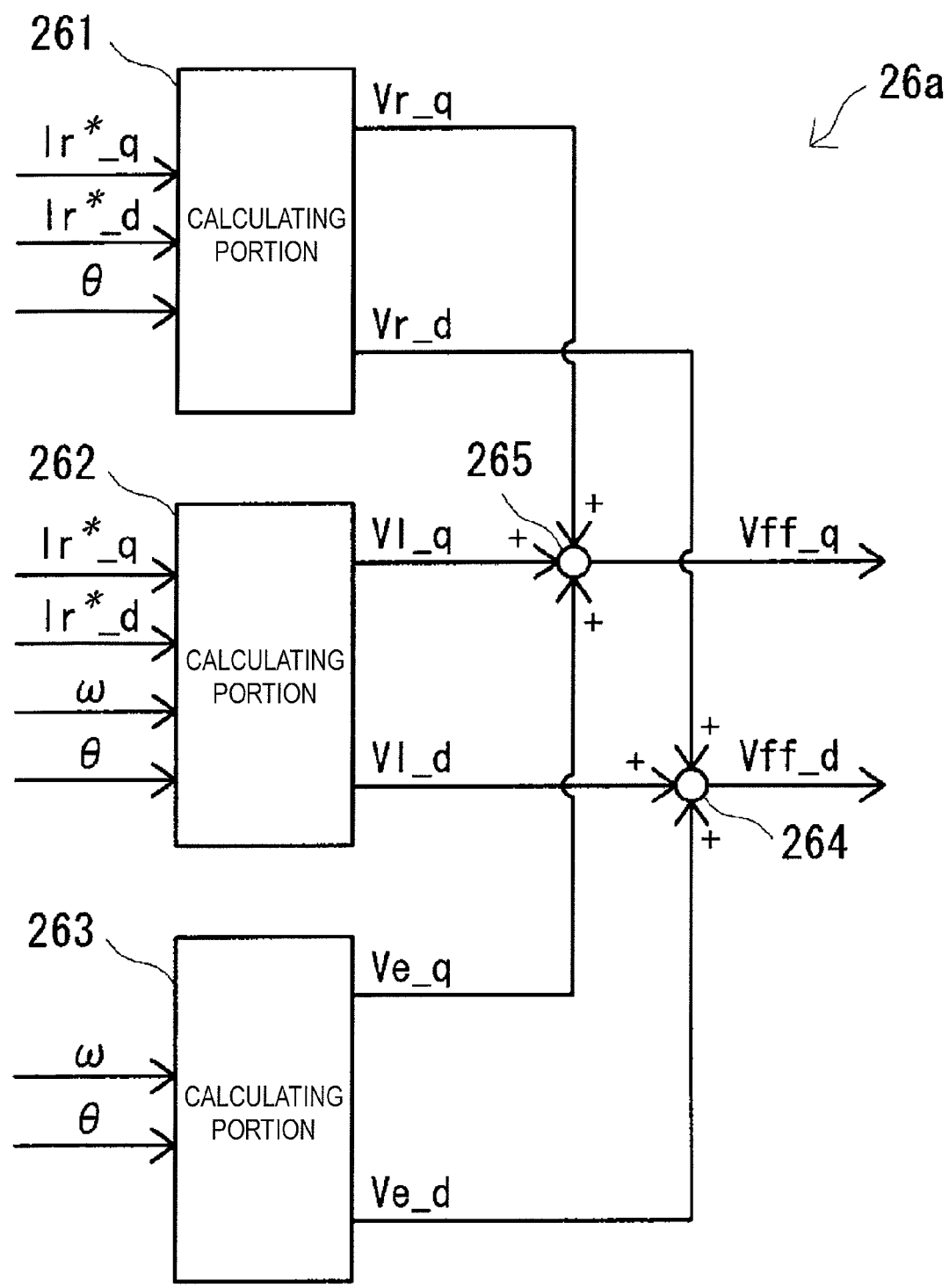
FIG. 3 is a view showing a correction value calculating portion of the motor drive device of FIG. 1.

As shown in FIG. 3, the correction value calculating portion 26a includes calculating portions 261 to 263, and adders 264 and 265. The calculating portions 261, 262, and 263 respectively serve as a "first calculating portion", a "second calculating portion", and a "third calculating portion" according to one or more embodiments of the present invention, and the adders 264 and 265 respectively serve as a "third adder" and a "fourth adder" of the present invention.

The calculating portion 261 receives the d-axis current command value Ir*_d and the q-axis current command value Ir*_q from the current command value calculating portion 21, and the rotation angle θ from the rotation calculating portion 22. The calculating portion 261 calculates a d-axis correction value Vr_d and a q-axis correction value Vr_q of the resistance component of the motor 150 based on the d-axis current command value Ir*_d and the q-axis current command value Ir*_q, and the rotation angle θ.

Specifically, the calculating portion 261 calculates the d-axis correction value Vr_d with the following equation (6), and calculates the q-axis correction value Vr_q with the following equation (7). The calculating portion 261 outputs the d-axis correction value Vr_d to the adder 264, and the q-axis correction value Vr_q to the adder 265. In the following equations (6) and (7), R stands for a resistor for one phase of the motor 150.

[Equation 3]

$$Vr\_d = [Ir^*\_d + Gt5 \cdot \{Ir^*\_q \cdot \sin(6\theta) - Ir^*\_d \cdot \cos(6\theta)\} + \quad (6)$$
$$Gt7 \cdot \{Ir^*\_q \cdot \sin(6\theta) + Ir^*\_d \cdot \cos(6\theta)\}] \times R$$

$$Vr\_q = [Ir^*\_q + Gt5 \cdot \{Ir^*\_q \cdot \cos(6\theta) + Ir^*\_d \cdot \sin(6\theta)\} - \quad (7)$$
$$Gt7 \cdot \{Ir^*\_q \cdot \cos(6\theta) - Ir^*\_d \cdot \sin(6\theta)\}] \times R$$

The calculating portion 262 receives the d-axis current command value Ir**_d and the q-axis current command value Ir*_q from the current command value calculating portion 21, and the rotation angle θ and the angular speed ω from the rotation calculating portion 22. The calculating portion 262 calculates a d-axis correction value Vl_d and a q-axis correction value Vl_q of the inductance component of the motor 150 based on the d-axis current command value Ir*_d and the q-axis current command value Ir*_q, and the rotation angle θ and the angular speed ω.

Specifically, the calculating portion 262 calculates the d-axis correction value Vl_d with the following equation (8), and calculates the q-axis correction value Vl_q with the following equation (9). The calculating portion 262 outputs the d-axis correction value Vl_d to the adder 264, and the q-axis correction value Vl_q to the adder 265. In the following equations (8) and (9), L stands for an inductance for one phase of the motor 150.

[Equation 4]

$$Vl\_d = [-Ir^*\_q + (5 \cdot Gt5) \cdot \{Ir^*\_q \cdot \cos(6\theta) + Ir^*\_d \cdot \sin(6\theta)\} + \quad (8)$$
$$(7 \cdot Gt7) \cdot \{Ir^*\_q \cdot \cos(6\theta) - Ir^*\_d \cdot \sin(6\theta)\}] \times L \times \omega$$

$$Vl\_q = [Ir^*\_d + (-5 \cdot Gt5) \cdot \{Ir^*\_q \cdot \sin(6\theta) - Ir^*\_d \cdot \cos(6\theta)\} + \quad (9)$$
$$(7 \cdot Gt7) \cdot \{Ir^*\_q \cdot \sin(6\theta) + Ir^*\_d \cdot \cos(6\theta)\}] \times L \times \omega$$

The calculating portion 263 receives the rotation angle θ and the angular speed ω from the rotation calculating portion 22. The calculating portion 263 calculates the d-axis correction value Ve_d and the q-axis correction value Ve_q of the inductive voltage component of the motor 150 based on the rotation angle θ and the angular speed ω.

Specifically, the calculating portion 263 calculates the d-axis correction value Ve_d with the following equation (10), and calculates the q-axis correction value Ve_w with the following equation (11). The calculating portion 263 outputs the d-axis correction value Ve_d to the adder 264 and the q-axis correction value Ve_q to the adder 265. In the following equations (10) and (11), Ke is the inductive voltage constant. Ge5 is the correction coefficient of the fifth-order harmonics of the inductive voltage, and Ge7 is the correction coefficient of the seventh-order harmonics of the inductive voltage. Ge5 and Ge7 are constants determined according to the specification etc. of the motor 150.

[Equation 5]

$$Ve\_d = \{-(Ge5+Ge7)\cdot\sin(6\theta)\} \times Ke \times \omega \quad (10)$$

$$Ve\_q = \{1-(Ge5-Ge7)\cdot\cos(6\theta)\} \times Ke \times \omega \quad (11)$$

The adder 264 adds the d-axis correction value Vr_d inputted from the calculating portion 261, the d-axis correction value Vl_d inputted from the calculating portion 262, and the d-axis correction value Ve_d inputted from the calculating portion 263 to calculate a d-axis voltage correction value Vff_d. The adder 264 outputs the d-axis voltage correction value Vff_d to the adder 26b (FIG. 1).

The adder 265 adds the q-axis correction value Vr_q inputted from the calculating portion 261, the q-axis correction value Vl_q inputted from the calculating portion 262, and the q-axis correction value Ve_q inputted from the calculating portion 263 to calculate a q-axis voltage correction value Vff_q. The adder 265 outputs the q-axis voltage correction value Vff_q to the adder 26c (FIG. 1).

As shown in FIG. 1, the adder 26b receives the d-axis voltage command value V*_d from the voltage command value calculating portion 25, and the d-axis voltage correction value Vff_d from the correction value calculating portion 26a. The adder 26b adds the d-axis voltage correction value Vff_d to the d-axis voltage command value V*_d to calculate the corrected d-axis voltage command value V_d. The adder 26b outputs the corrected d-axis voltage command value V_d to the drive signal generating portion 27.

The adder 26b receives the q-axis voltage command value V*_q from the voltage command value calculating portion 25, and the q-axis voltage correction value Vff_q from the correction value calculating portion 26a. The adder 26c adds the q-axis voltage correction value Vff_q to the q-axis voltage command value V*_q to calculate the corrected q-axis voltage command value V_q. The adder 26c outputs the corrected q-axis voltage command value V_q to the drive signal generating portion 27.

The drive signal generating portion 27 includes a dq—three phase converting portion 27a and a PWM signal generating portion 27b.

The dq—three phase converting portion 27a converts the d-axis voltage command value V_d inputted from the adder 26b and the q-axis voltage command value V_q inputted from the adder 26c to the application voltage values Vu, Vv, Vw of three phases using the rotation angle θ of the motor 150 calculated by the rotation calculating portion 22. The dq—three phase converting portion 27a outputs the application voltage values Vu, Vv, Vw of three phases to the PWM signal generating portion 26b. The dq—three phase conversion is carried out according to the following equation (12).

[Equation 6]

$$\begin{pmatrix} Vu \\ Vv \\ Vw \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos\theta & -\sin\theta \\ \sin\theta & \cos\theta \end{pmatrix} \begin{pmatrix} V\_d \\ V\_q \end{pmatrix} \quad (12)$$

The PWM signal generating portion 27b generates a PWM signal (PWMu, PWMv, PWMw) having a predetermined duty for controlling the ON/OFF state of the switching elements 11b to 16b (see FIG. 2) of the inverter 1 based on the application voltage values Vu, Vv, Vw of the three phases. The PWM signal generating portion 27b then outputs the PWM signal to the inverter 1.

The PWM signal PWMu is a signal for driving the switching elements 11b and 12b of the U phase, the PWM signal PWMv is a signal for driving the switching elements 13b and 14b of the V phase, and the PWM signal PWMw is a signal for driving the switching elements 15b and 16b of the W phase.

Figure 4:
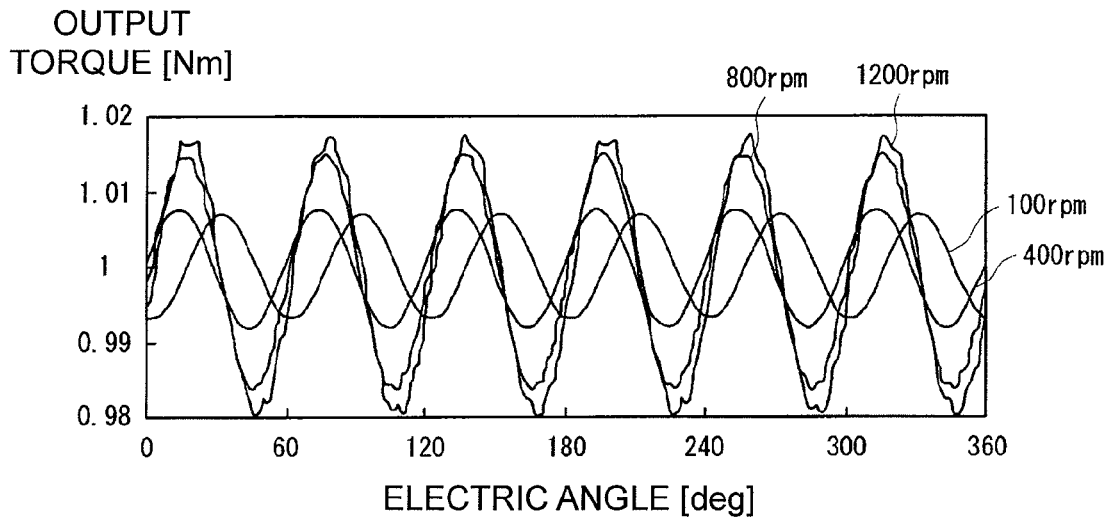
FIG. 4 is a graph showing an outputted torque in a motor drive device according to a first comparative example.

The simulation performed to check the effects of one or more embodiments of the present invention described above will now be described. In this simulation, the fifth-order harmonics are superimposed on the inductive voltage of the motor, and the outputted torque and the U phase current in the motor drive device according to first and second comparative examples are measured. Furthermore, the fifth-order harmonics are superimposed on the inductive voltage of the motor, and the outputted torque and the U phase current in the motor drive device according to an example corresponding to one or more embodiments of the present invention are measured. In the simulation, the number of rotations of the motor was 100 rpm, 400 rpm, 800 rpm, and 1200 rpm. The measurement results are shown in FIG. 4 to FIG. 9. FIG. 4, FIG. 6, and FIG. 8 are views showing the state of the torque ripple, where the torque ripple increases as fluctuation width of the outputted torque on the vertical axis increases.

Figure 10:
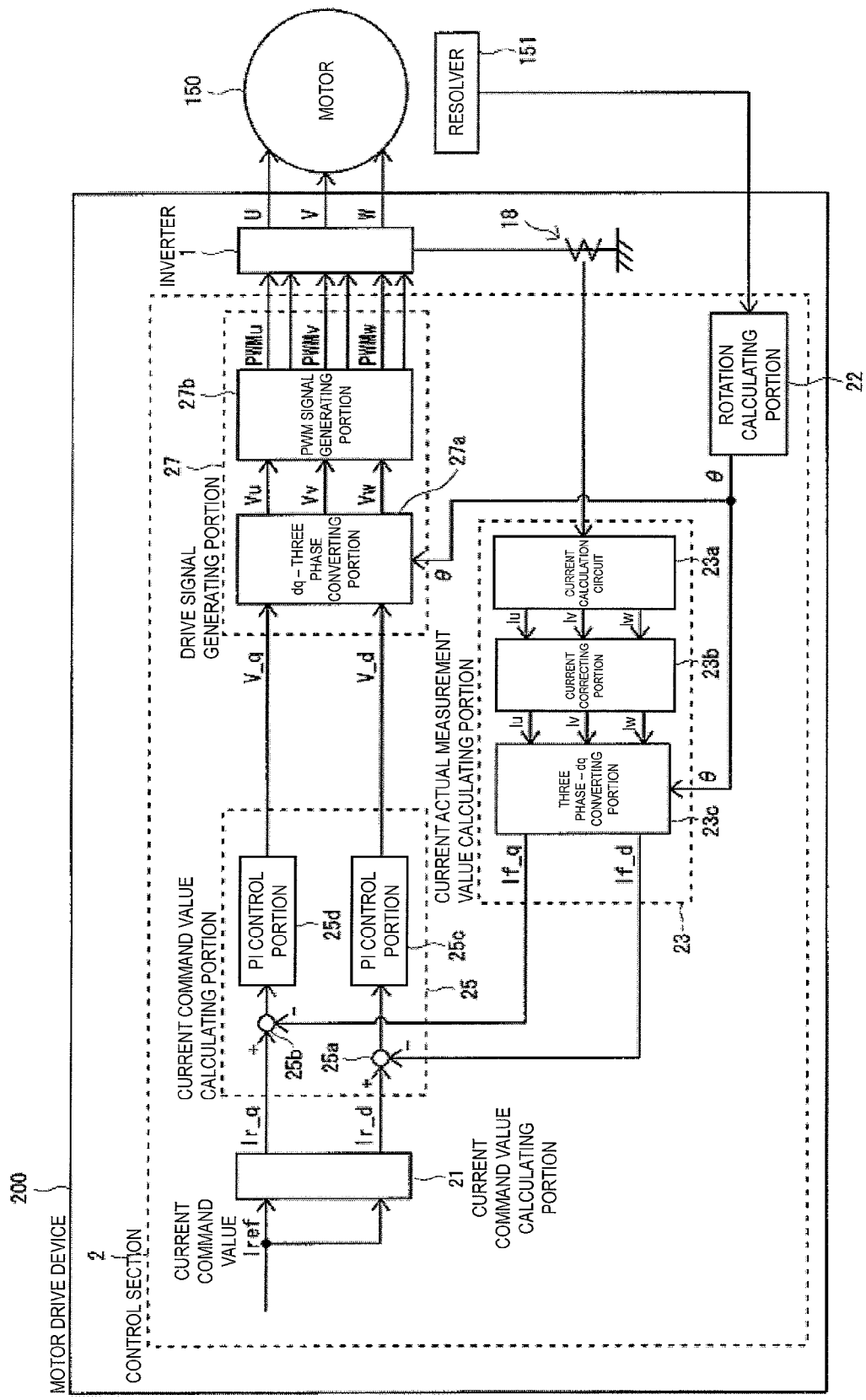
FIG. 10 is a block diagram showing a configuration of the motor drive device according to the first comparative example.
Figure 11:
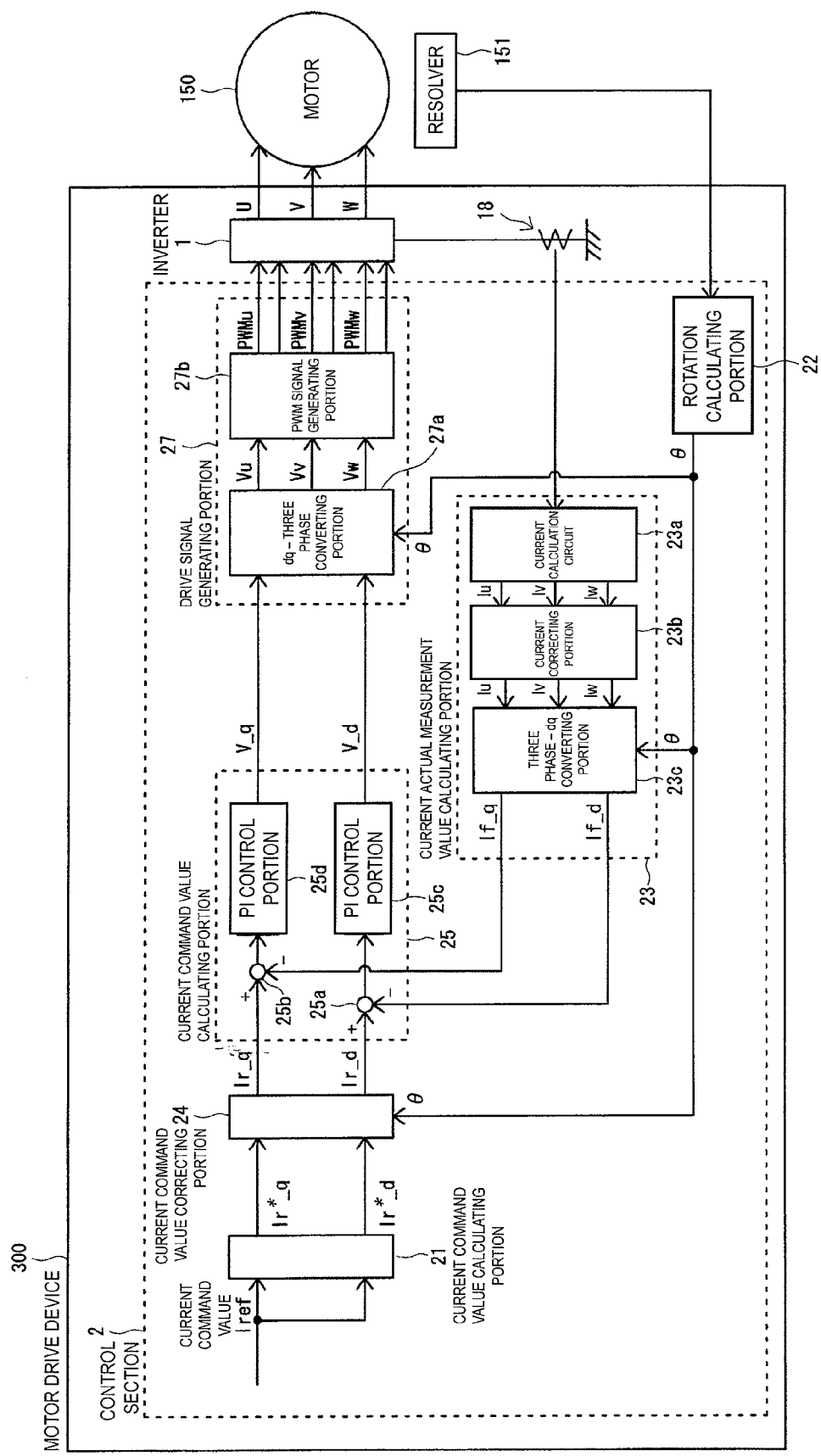
FIG. 11 is a block diagram showing a configuration of the motor drive device according to the second comparative example.

As shown in FIG. 10, the current command value correcting portion 24 and the voltage command value correcting portion 26 of FIG. 1 are not arranged in a motor drive device 200 according to the first comparative example. In other words, the motor drive device 200 according to the first comparative example does not carry out the torque ripple correction and the feed forward control. As shown in FIG. 11, the voltage command value correcting portion 26 of FIG. 1 is not arranged in a motor drive device 300 according to a second comparative example. In other words, the motor drive device 300 according to the second comparative example carries out the torque ripple correction and does not carry out the feed forward control.

Figure 5:
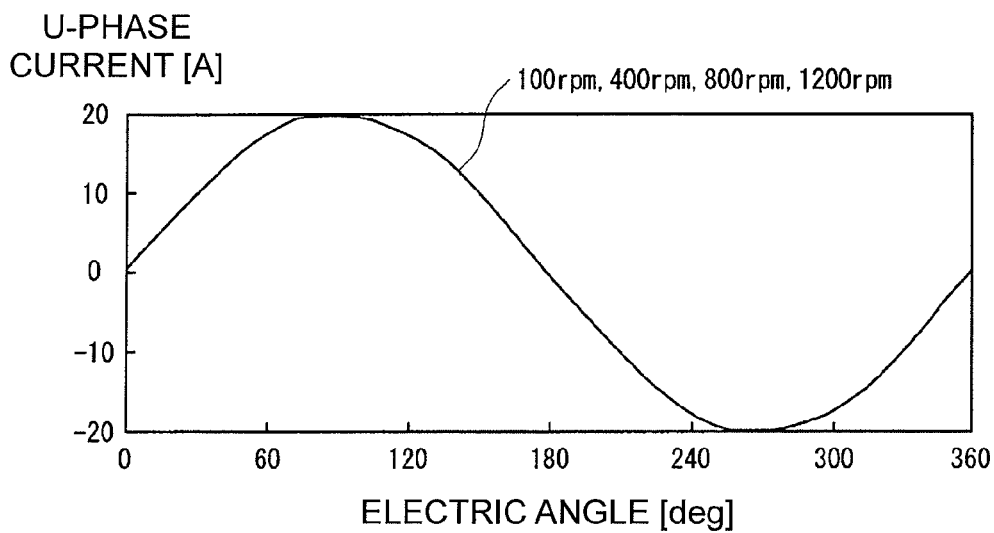
FIG. 5 is a graph showing a U-phase current in the motor drive device according to the first comparative example.
Figure 6:
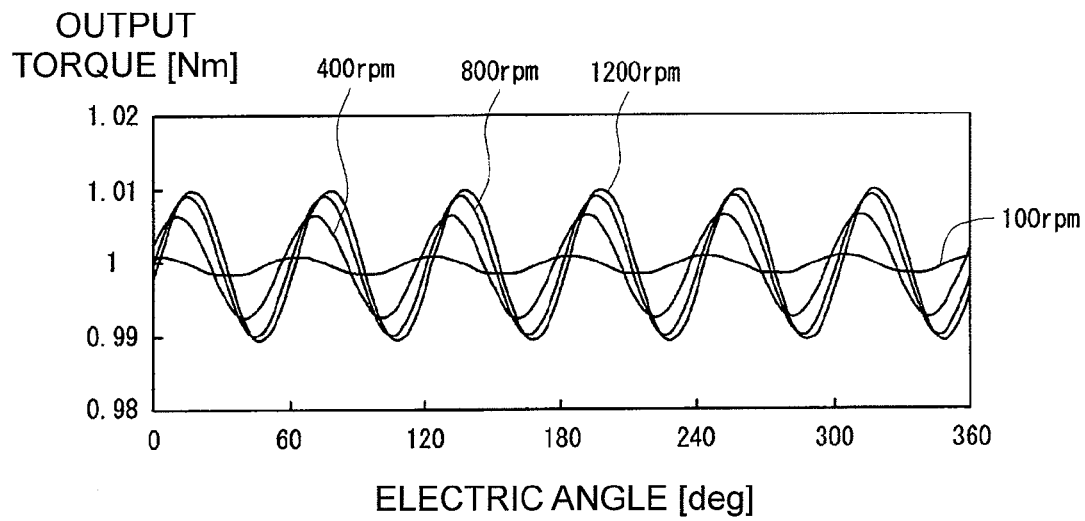
FIG. 6 is a graph showing an outputted torque in a motor drive device according to a second comparative example.

First, the outputted torque in the motor drive device 200 according to the first comparative example is shown in FIG. 4, and the U phase current in the motor drive device 200 according to the first comparative example is shown in FIG. 5. In FIG. 5, the U phase currents substantially coincided with each other irrespective of the number of rotations of the motor. In the motor drive device 200 according to the first comparative example, the fifth-order harmonics are superimposed on the inductive voltage and hence the sixth-order torque ripple occurs, as shown in FIG. 4.

Figure 7:
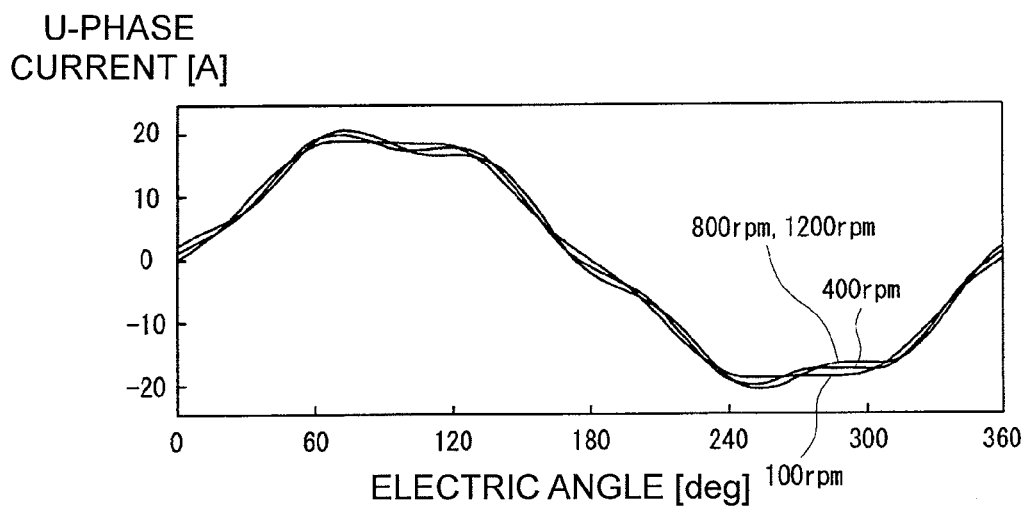
FIG. 7 is a graph showing a U-phase current in the motor drive device according to the second comparative example.
Figure 8:
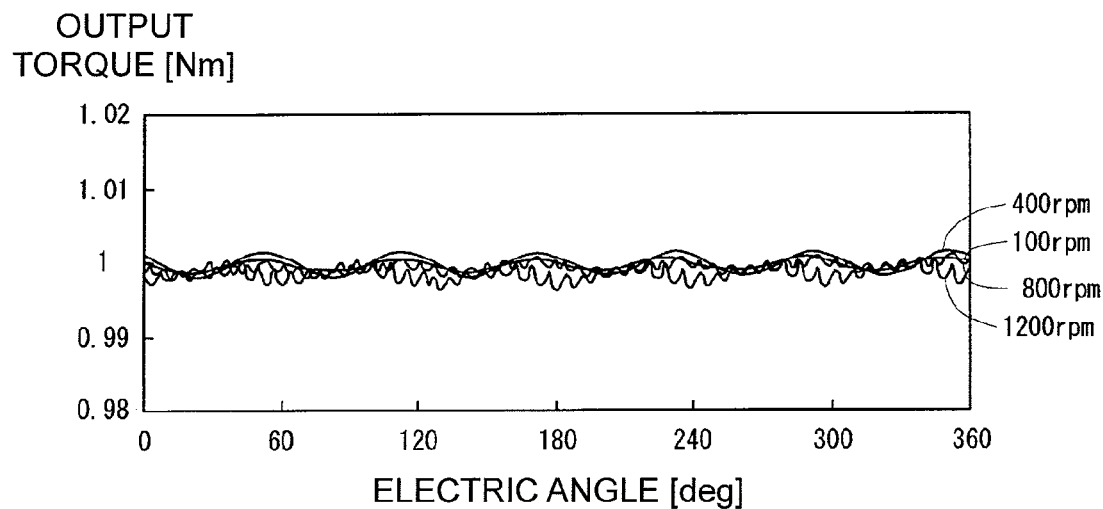
FIG. 8 is a graph showing an outputted torque in a motor drive device according to an example.

The outputted torque in a motor drive device 300 according to a second comparative example is shown in FIG. 6 and the U phase current in the motor drive device according to the second comparative example is shown in FIG. 7. In FIG. 7, the U phase currents when the number of rotations of the motor is 800 rpm and 1200 rpm substantially coincided with each other. As shown in FIG. 6, the torque ripple is suppressed in the motor drive device 300 according to the second comparative example in which the current command value correcting portion 24 is arranged, compared to the case of the motor drive device 200 according to the first comparative example (FIG. 4). However, the torque ripple increases with increase in the number of rotations of the motor, and the torque ripple cannot be sufficiently suppressed in the motor drive device 300 according to the second comparative example. This is assumed to be because distortion occurs in the drive current of the motor, as shown in FIG. 7, due to significance in the delay in feedback from the rotation calculating portion 22 and the current actual measurement value calculating portion 23, and the delay in calculation of each portion such as the current command value correcting portion 24 with increase in the number of rotations of the motor.

Figure 9:
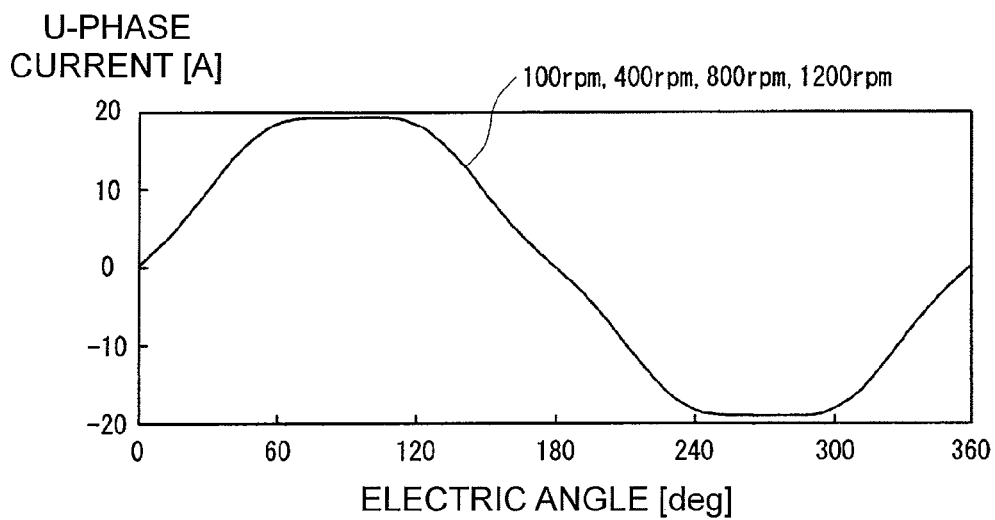
FIG. 9 is a graph showing a U-phase current in the motor drive device according to the example.

The outputted torque in the motor drive device 100 according to an example in shown in FIG. 8, and the U phase current is shown in FIG. 9. In FIG. 9, the U phase currents are substantially coincided with each other irrespective of the number of rotations of the motor. The occurrence of torque ripple can be sufficiently suppressed regardless of the number of rotations of the motor, as shown in FIG. 8, in the motor drive device 100 according to an example in which the current command value correcting portion 24 and the voltage command value correcting portion 26 are arranged. This is assumed to be because the occurrence of distortion in the drive current of the motor can be suppressed, as shown in FIG. 9, as the delay in feedback from the rotation calculating portion 22 and the current actual measurement value calculating portion 23, and the delay in the calculation of each portion such as the current command value correcting portion 24 can be appropriately compensated by the voltage command value correcting portion 26.

The drive current and the outputted torque in the motor drive device 200 according to the first comparative example are measured with the fifth-order harmonics and the seventh-order harmonics superimposed on the inductive voltage of the motor. The drive current and the outputted torque in the motor drive device 100 according to an example are also measured with the fifth-order harmonics and the seventh-order harmonics superimposed on the inductive voltage of the motor. In such a simulation, the number of rotations of the motor is assumed as 100 rpm. The measurement results are shown in FIG. 12 and FIG. 13.

Figure 12:
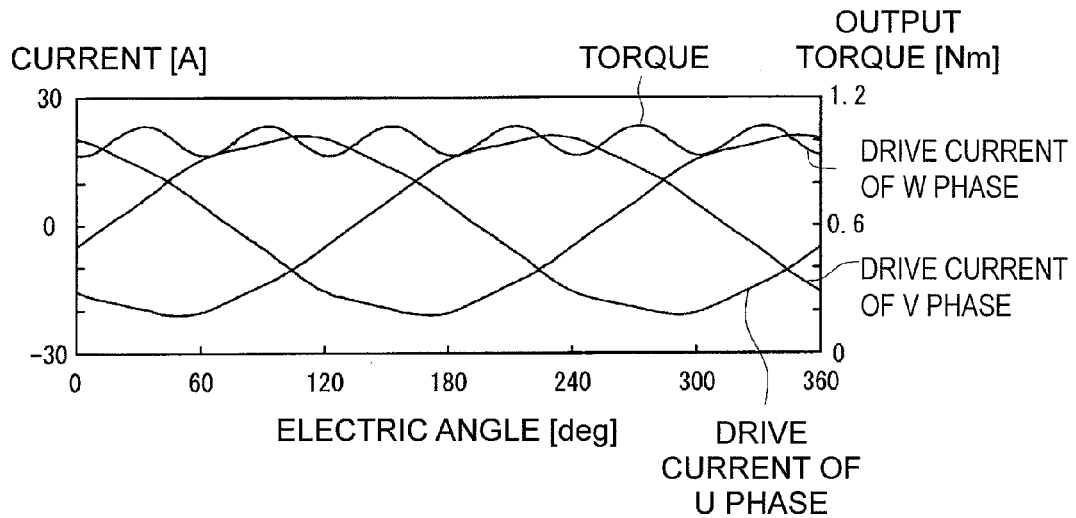
FIG. 12 is a graph showing an outputted torque and a drive current in the motor drive device according to the first comparative example.
Figure 13:
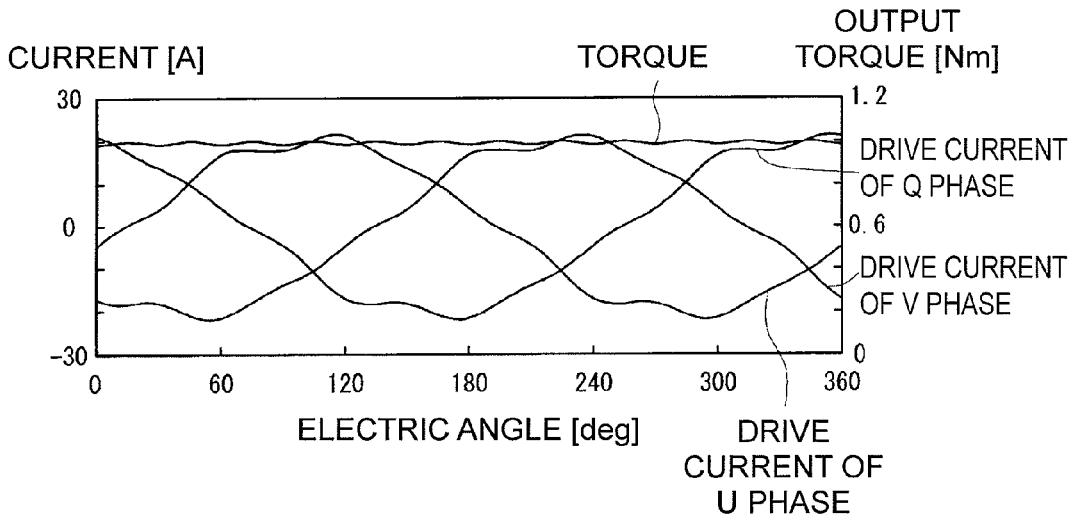
FIG. 13 is a graph showing an outputted torque and a drive current in the motor drive device according to an example.
Figure 14:
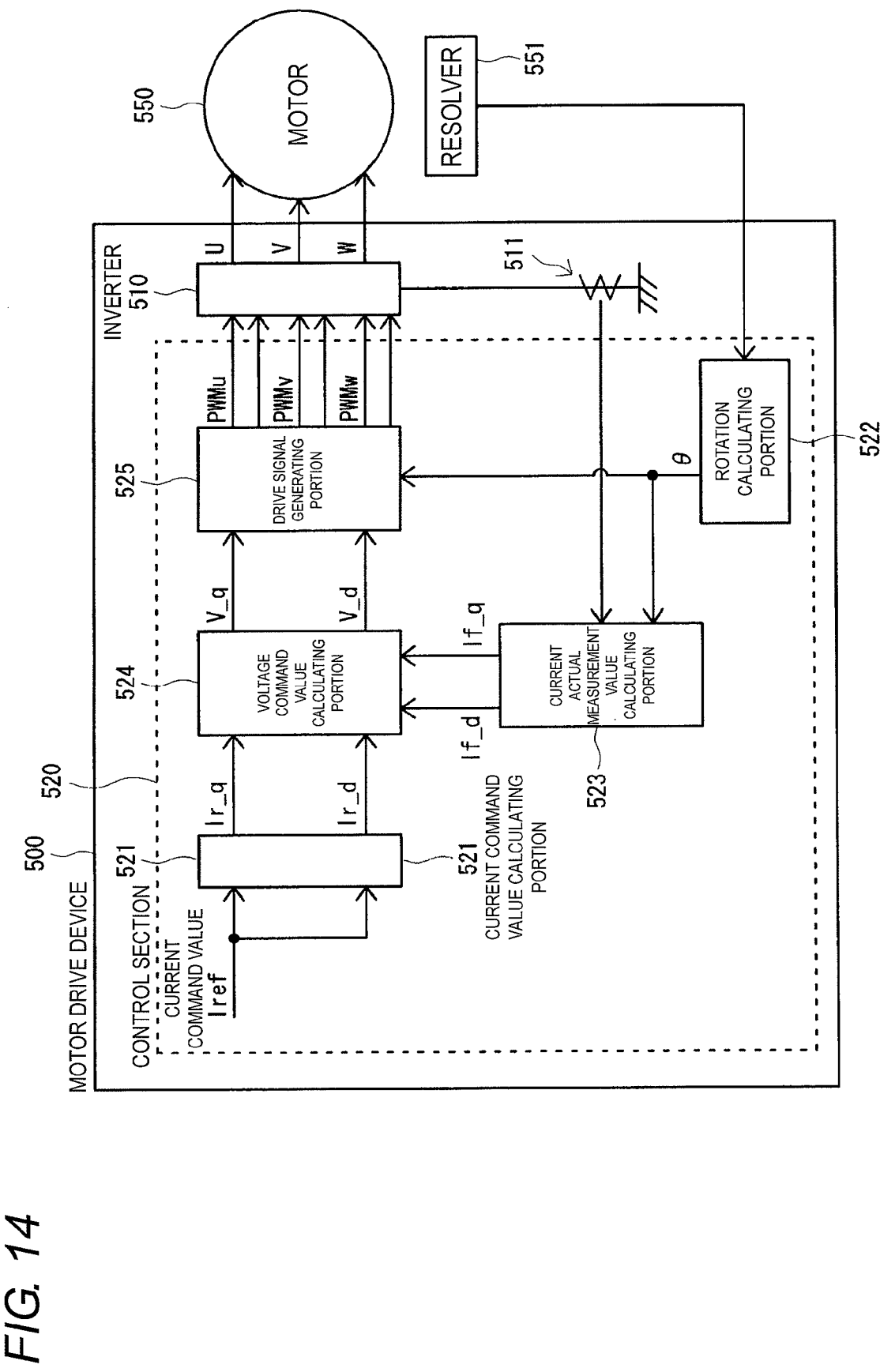
FIG. 14 is a block diagram showing a configuration of a conventional motor drive device.

As shown in FIG. 12, the sixth-order torque ripple occurs since the fifth-order harmonics and the seventh-order harmonics are superimposed on the inductive voltage in the motor drive device 200 according to the first comparative example. As shown in FIG. 13, on the other hand, the occurrence of the torque ripple can be sufficiently suppressed even if the fifth-order harmonics and the seventh-order harmonics are superimposed on the inductive voltage in the motor drive device 100 according to an example.

In one or more embodiments of the present invention, the current command value correcting portion 24 for correcting the sixth-order torque ripple that occurs from the fifth-order harmonics and the seventh-order harmonics of the inductive voltage of the motor 150, and the voltage command value correcting portion 26 for performing the feed forward control to enhance the responsiveness at the time of high speed rotation of the motor 150 are arranged, as described above. Therefore, the delay in the feedback and the delay in the calculation of each portion can be compensated by the voltage command value correcting portion 26 even if the motor 150 rotates at high speed, so that the occurrence of torque ripple and abnormal noise can be sufficiently suppressed by the current command value correcting portion 24.

The present invention can adopt various embodiments other than the above. For instance, an example in which the current command value correcting portion 24 corrects the sixth-order torque ripple that occurs from the fifth-order harmonics and the seventh-order harmonics of the inductive voltage of the motor 150 is shown in the embodiments described above, but not limited thereto, the current command value correcting portion 24 may correct only the sixth-order torque ripple that occurs from the fifth-order harmonics or the seventh-order harmonics of the inductive voltage of the motor 150.

The current command value correcting portion 24 may correct the torque ripple (twelfth order torque ripple) that occurs from other harmonics (e.g., eleventh order harmonics, thirteenth order harmonics) of the inductive voltage of the motor 150. In this case, the correction value calculating portion 26*a* of the voltage command value correcting portion 26 may calculate the d-axis voltage correction value Vff_d and the q-axis voltage correction value Vff_q in view of other harmonics.

In the embodiments described above, an example in which the motor 150 is a three phase motor has been described, but not limited thereto, the motor 150 may be a multi-phase motor of four or more phases.

In the embodiments described above, an example in which the motor 150 is a brushless motor has been described, but not limited thereto, the motor 150 may be a motor with brush.

In the embodiments described above, an example in which the switching elements 11b to 16b are FET has been described, but not limited thereto, the switching elements 11b to 16b may be an IGBT (Insulated Gate Bipolar Transistor).

In the embodiments described above, an example in which the resolver 151 for detecting the rotation angle of the motor 150 is arranged has been described, but not limited thereto, other angle sensors such as an encoder for detecting the rotation angle of the motor 150 may be arranged.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor drive device comprising:
    a drive circuit for driving a motor; and
    a control section for controlling the drive circuit;
    wherein the control section comprises:
        a current command value calculating portion for calculating a current command value,
        a rotation calculating portion for calculating a rotation angle and an angular speed of the motor,
        a current command value correcting portion for correcting the current command value calculated by the current command value calculating portion based on the rotation angle calculated by the rotation calculating portion,
        a voltage command value calculating portion for calculating a voltage command value based on the current command value corrected by the current command value correcting portion,
        a voltage command value correcting portion for correcting the voltage command value calculated by the voltage command value calculating portion based on the current command value calculated by the current command value calculating portion and the rotation angle and the angular speed calculated by the rotation calculating portion, and
        a drive signal generating portion for generating a drive signal based on the voltage command value corrected by the voltage command value correcting portion.

2. The motor drive device according to claim 1, wherein
the current command value calculating portion calculates a d-axis current command value and a q-axis current command value; and
    the voltage command value correcting portion corrects the voltage command value calculated by the voltage command value calculating portion based on the d-axis current command value and the q-axis current command value calculated by the current command value calculating portion, and the rotation angle and the angular speed calculated by the rotation calculating portion.

3. The motor drive device according to claim 2, further comprising a current detection portion for detecting the current supplied from the drive circuit to the motor; wherein
    the control section further comprises a current actual measurement value calculating portion for calculating a d-axis current actual measurement value and a q-axis current actual measurement value based on the detection result of the current detection portion and the rotation angle calculated by the rotation calculating portion;
    the current command value correcting portion corrects the d-axis current command value and the q-axis current command value calculated by the current command value calculating portion based on the rotation angle calculated by the rotation calculating portion; and
    the voltage command value calculating portion calculates a d-axis voltage command value based on the d-axis current command value corrected by the current command value correcting portion and the d-axis current actual measurement value, and calculates a q-axis voltage command value based on the q-axis current command value corrected by the current command value correcting portion and the q-axis current actual measurement value.

4. The motor drive device according to claim 3, wherein the voltage command value correcting portion comprises:
    a correction value calculating portion for calculating a d-axis correction value and a q-axis voltage correction value based on the d-axis current command value and the q-axis current command value calculated by the current command value calculating portion, and the rotation angle and the angular speed calculated by the rotation calculating portion,
    a first adder for adding the d-axis voltage correction value calculated by the correction value calculating portion to the d-axis voltage command value calculated by the voltage command value calculating portion, and
    a second adder for adding the q-axis voltage correction value calculated by the correction value calculating portion to the q-axis voltage command value calculated by the voltage command value calculating portion; and
    the drive signal generating portion generates the drive signal based on the d-axis voltage command value, to which the d-axis voltage correction value is added by the first adder, the q-axis voltage command value, to which the q-axis voltage correction value is added by the second adder, and the rotation angle calculated by the rotation calculating portion.

5. The motor drive device according to claim 4, wherein the correction value calculating portion of the voltage command value correcting portion comprises:
    a first calculating portion for calculating a d-axis correction value and a q-axis correction value of a resistance component of the motor based on the d-axis current command value and the q-axis current command value calculated by the current command value calculating portion, and the rotation angle calculated by the rotation calculating portion,
    a second calculating portion for calculating a d-axis correction value and a q-axis correction value of an inductance component of the motor based on the d-axis current command value and the q-axis current command value calculated by the current command value calculating portion, and the rotation angle and the angular speed calculated by the rotation calculating portion, and
    a third calculating portion for calculating a d-axis correction value and a q-axis correction value of an inductive voltage component of the motor based on the rotation angle and the angular speed calculated by the rotation calculating portion.

6. The motor drive device according to claim 5, wherein the correction value calculating portion of the voltage command value correcting portion further comprises:
    a third adder for adding the d-axis correction value calculated by the first calculating portion, the d-axis correction value calculated by the second calculating portion, and the d-axis correction value calculated by the third calculating portion to calculate the d-axis voltage correction value, and a fourth adder for adding the q-axis correction value calculated by the first calculating portion, the q-axis correction value calculated by the second calculating portion, and the q-axis correction value calculated by the third calculating portion to calculate the q-axis voltage correction value.

* * * * *